UNITED STATES PATENT OFFICE.

NATHAN ROSENWASSER, OF CLEVELAND, OHIO.

PREPARING CARBOLIZED JUTE.

SPECIFICATION forming part of Letters Patent No. 243,404, dated June 28, 1881.

Application filed March 29, 1880. (Specimens.)

*To all whom it may concern:*

Be it known that I, NATHAN ROSENWASSER, of Cleveland, in the county of Cuyahoga and State of Ohio, have invented a new and useful Process for Preparing Carbolized Jute; and I do hereby declare that the following is a full and exact description of the same.

My invention relates to certain improvements in the preparation and treatment of jute, or any equivalent substance, with carbolic acid, to adapt it for use as a dressing for wounds.

By the old method of treating jute with carbolic acid held in solution by alcohol, which is used for dissolving the various ingredients, it is found that the product is much more expensive and no better in quality than that prepared by my method, which is as follows:

For one pound or seven thousand grains of jute, I take seven hundred (700) grains of crystalized carbolic acid; paraffine, seven hundred (700) grains; resin, twenty-eight hundred (2800) grains; benzine, gasoline, or naphtha, three (3) pints. Or, to one pound of jute is required ten per cent. of carbolic acid, forty per cent. of resin, and ten per cent. of paraffine, with enough benzine to thoroughly moisten. The larger the quantity of jute impregnated at one time the smaller in proportion is the requisite quantity of benzine. The resin, in coarse powder, should first be dissolved in the benzine, after which the paraffine, broken in small pieces, is added, and then the carbolic acid, (which must be free from moisture,) previously melted by placing the vessel containing it in hot water. The various solid substances are readily dissolved in the cold benzine. The entire operation must be performed in the open air, or in a room in which there is no gas-light or flame of any kind, to avoid danger from explosion, which would be likely to result from the vapor generated by the use of volatile oils, like benzine. I prefer the benzine to be what is commercially known as "74° deodorized gasoline."

Any receptacle that will answer to pack the jute in tightly and allow the liquid to percolate through, with a stop-cock or similar attachment to draw of the liquid from below, will answer for small quantities, such as a pound, or less. An ordinary tin percolator answers the purpose. For preparing larger quantities an oil-can open above, or a barrel having an open top with a faucet below, will answer. The jute, having been sufficiently picked to insure an even and regular body, is packed as tightly as possible into the percolator, and the prepared benzine solution poured on from above, and what is not absorbed allowed to drain from the faucet into a receptacle below. This is poured in at the top again and the operation continued until all the liquid has been absorbed. The jute is then taken out of the percolator, and the threads partially picked and spread out to dry, either in the open air or in a room suitable for drying by means of cold drafts of air. On account of safety, drying in the open air is preferable.

Having thus described my invention, what I claim as new, and desire to secure by Letters Patent, is—

1. The process of carbolizing jute or other fibrous substances, which consists in thoroughly percolating the same with an admixture of carbolic acid, resin, paraffine, and benzine, in the manner and in the proportions described, as and for the purpose set forth.

2. A dressing for wounds, composed of jute or other fibrous substances and an admixture of carbolic acid, resin, paraffine, and benzine, in about the proportions specified.

This specification signed and witnessed this 28th day of February, 1880.

NATHAN ROSENWASSER.

Witnesses:
GEO. C. TRACY,
S. M. WOLCOTT.